(12) United States Patent
Baragona

(10) Patent No.: US 6,220,737 B1
(45) Date of Patent: Apr. 24, 2001

(54) VEHICLE ILLUMINATION DEVICE

(76) Inventor: Michael F. Baragona, 7- S. Exuma Rd., Key Largo, FL (US) 33037

( * ) Notice: Subject to any disclaimer, the term of this patent is extended or adjusted under 35 U.S.C. 154(b) by 0 days.

(21) Appl. No.: 09/369,119

(22) Filed: Aug. 5, 1999

(51) Int. Cl.[7] .................................................. B60Q 1/26
(52) U.S. Cl. ............................ 362/540; 362/339; 362/396
(58) Field of Search .................................. 362/191, 335, 362/340, 396, 486, 493, 494, 505, 540, 337, 339; 40/554, 555, 556, 579, 580, 560; 353/13

(56) References Cited

U.S. PATENT DOCUMENTS

| 1,395,039 | * | 10/1921 | Chmurski | 362/540 |
| 1,491,937 | * | 4/1924 | Walker | 362/493 |
| 2,276,104 | * | 3/1942 | Shaunessey | 40/560 |
| 2,675,983 | * | 4/1954 | King | 362/397 |
| 3,401,596 | * | 9/1968 | Hirsch | 362/806 |
| 4,821,019 | * | 4/1989 | Taylor | 362/494 |
| 5,690,420 | * | 11/1997 | Saldana, Sr. | 362/540 |

* cited by examiner

Primary Examiner—Y. Quach
(74) Attorney, Agent, or Firm—Malin, Haley & DiMaggio, P.A.

(57) ABSTRACT

An illumination device for vehicles for projecting an image onto a surface, more especially for visually promoting or advertising items, causes, groups, individuals, businesses, or the like in darkness. The invention includes a body that contains an illumination source and a lens aligned therewith. Between the illumination source and the lens is a template or imaging film. The illumination source is powered by the vehicle.

15 Claims, 5 Drawing Sheets

VEHICLE ILLUMINATION DEVICE

BACKGROUND OF THE INVENTION

1. Field of the Invention

This invention relates to illuminated displays, and relates in particular to a device for projecting an image onto a road, vehicle surface, or any other surface.

2. Description of Related Art

Vehicles have been equipped with illumination devices for quite some time. Safety considerations have been the primary reason for the utilization of vehicle illumination devices.

Illumination devices utilized in vehicles are known in the background art. One such device has been invented by Siegel as disclosed in U.S. Pat. No. 1,720,531. This display device is an article that attaches to an automobile headlight for purposes of displaying letters or names on the headlight.

The invention disclosed in U.S. Pat. No. 2,276,104 to Shaunessey teaches a vehicle tail light utilized as a traffic signal. The tail light is attached to a vehicle such as an automobile and means are employed for projecting the word "Stop" upon a road surface in addition to including means for illuminating a license plate and performing a tail light function.

U.S. Pat. No. 3,017,500 to Pezzeopane discloses the use of motor vehicle lamps to provide lights for illuminating motor vehicle wheels in which the lights are permanently installed on the vehicles so that it is only necessary to press a button or close a switch to throw light on the wheels and to the sides of the vehicle when performing work on the vehicle at night.

A number of background devices which teach the use of vehicle illumination devices are found in the following U.S. Patents: Shaw U.S. Pat. No. 1,145,087; Chmurski U.S. Pat. No. 1,395,039; Stewart U.S. Pat. No. 1,521,998; Miller U.S. Pat. No. 1,736,616; Kurtz U.S. Pat. No. 1,810,216; Larose U.S. Pat. No. 2,023,845; Bridge U.S. Pat. No. 2,081,899; Geary U.S. Pat. No. 2,786,935.

Those who drive vehicles during daylight hours may choose to visually promote or advertise an item, cause, group, individual, business, or the like without the aid of projected light. Utilizing a vehicle for visual promotion or advertisement may be accomplished by means of paint on the surface of the vehicle, magnetic decals, or similar means that are visible during daylight hours. However, individuals that operate vehicles in the dark do not presently have the ability to effectively promote or advertise utilizing visual means.

As a result, individuals that operate vehicles in the dark do not promote or advertise by visual means.

BRIEF SUMMARY OF THE INVENTION

The present invention provides a unique way to project an image from a vehicle, especially in the dark. The vehicle illumination device comprises a body with first and second ends. At the first end, the body houses an illumination source. At the second end, the body contains a lens that is aligned with the illumination source. Between the first and second ends of the body is a template. The body is mounted to a vehicle and the second end thereof is aimed at a surface (eg. road, side of vehicle, etc.) onto which an image is projected.

In one embodiment, the vehicle illumination device utilizes a means for attachment to a side portion of a vehicle (e.g. side-mounted rear-view mirror or door) for projecting an image onto a surface. In an alternative embodiment, the device is attached to the vehicle frame or the bumper for projecting an image onto a road surface, a vehicle, or anywhere else.

It is therefore an object of this invention to provide those who utilize vehicles in the dark a unique way to project an image from a vehicle to promote or advertise an item, cause, group, individual, business, or the like.

It is another object of this invention to project an image from a vehicle onto a surface.

It is yet another object of this invention to provide an apparatus for attaching the projection device to a vehicle body, vehicle bumper, vehicle undercarriage or anywhere else for projecting an image onto a surface.

In accordance with these and other objects which will become apparent hereinafter, the instant invention will now be described with particular reference to the accompanying drawings.

DETAILED DESCRIPTION OF THE INVENTION

Figure 1:
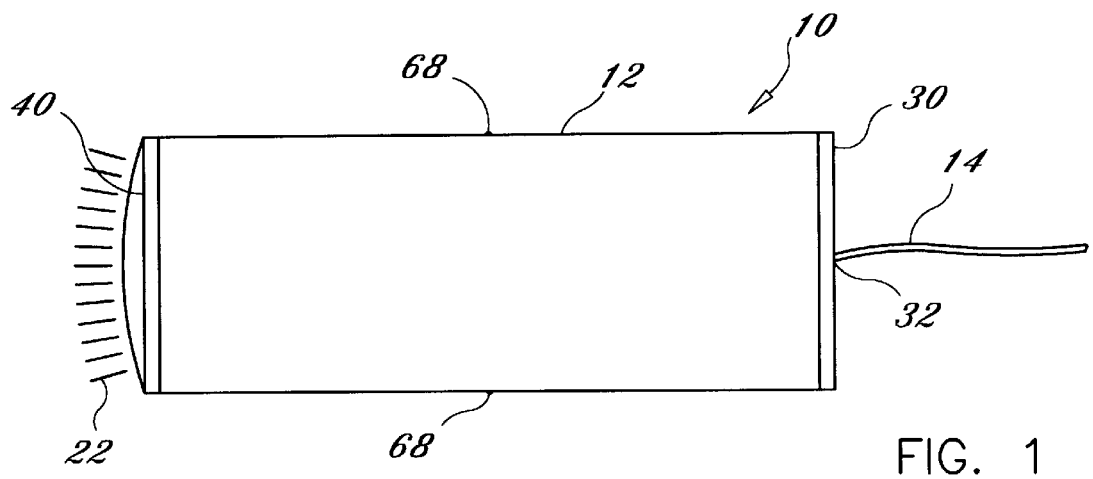
FIG. 1 is a side elevational view of the invention.
Figure 2:
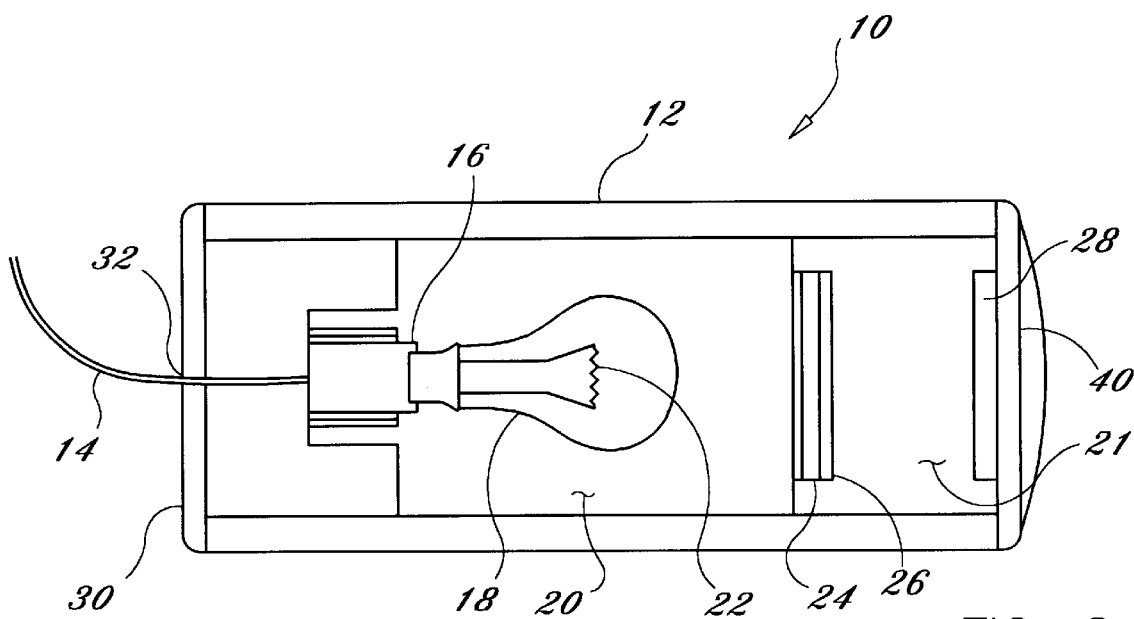
FIG. 2 is a cross-sectional elevational view of the invention taken along lines 2—2 of FIG. 3.

Referring now to the drawings, the present invention is shown generally at numeral 10. The invention 10 may be made of a single or multi-piece solid housing or case made of high impact plastic or other durable material. The invention 10 is comprised of a housing or body 12 which acts as a light-focusing tube and which may be cylindrical, rectangular, or any other suitable shape, with a first end 30 and a second end 40. Body 12 defines a small opening 32 in first end 30 for placement of electrical wiring 14 into body 12. As depicted in FIG. 2, electrical wiring 14 is connected to light source 16 in internal cavity 20 of body 12, which supplies electrical current to illuminate bulb 18. Bulb 18 produces light 22 in internal cavity 20 that travels through a template, imaging film or the like 26 that is held stationary against a retaining land by retaining ring 24. Light 22 continues through internal cavity 21, through lens 28 or the like, and finally out of second end 40 onto the projection surface. Preferably lens 28 is a Fresnel lens, which, due to its stepped setbacks, exhibits the properties of a much thicker lens while occupying only a small space, which allows device 10 to be compact.

Figure 3:
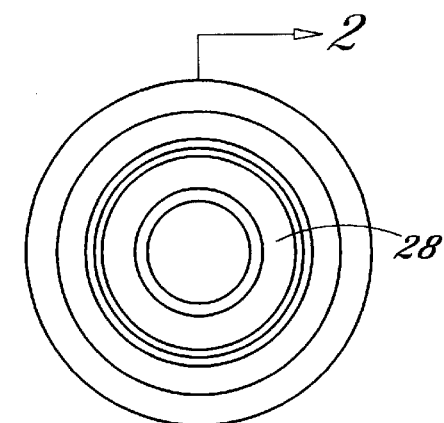
FIG. 3 is a front elevational view of the invention.

FIG. 3 depicts a lens 28 which can be used with the instant invention. It is believed that a lens having the following characteristics is suitable for projecting an image from a vehicle to a surface: an acrylic Fresnel lens 2⅛"×2¼" with 215 circular grooves per inch, a focal length of 0.580 ' and a thickness of 0.05'.

Figure 4:
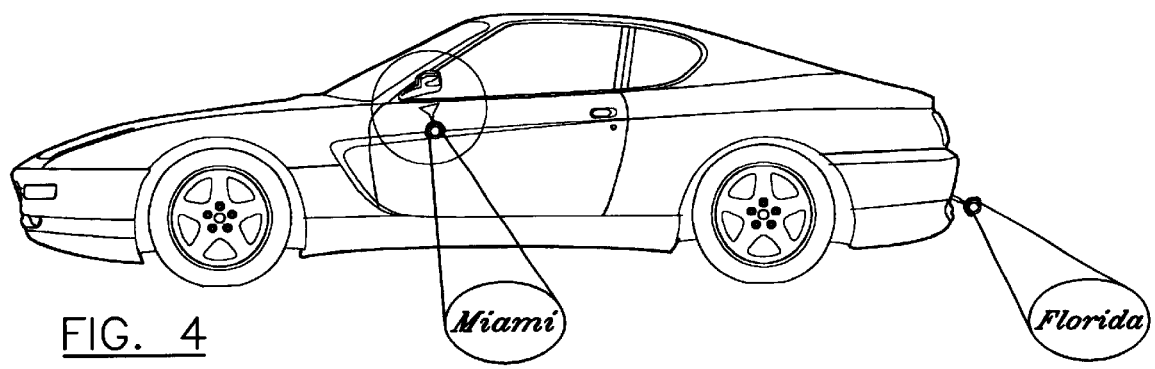
FIG. 4 is a perspective view of the invention attached to a vehicle in two alternative locations.

FIG. 4 depicts the instant invention attached to a vehicle with the use of "C-clamp" or the like in two places. The bulb 18 may be a 2.33 volt 270 milliamp crypton directional bulb, or any other suitable source of light. Lens 28 seats against shoulder 25 of housing 12.

Figure 5:
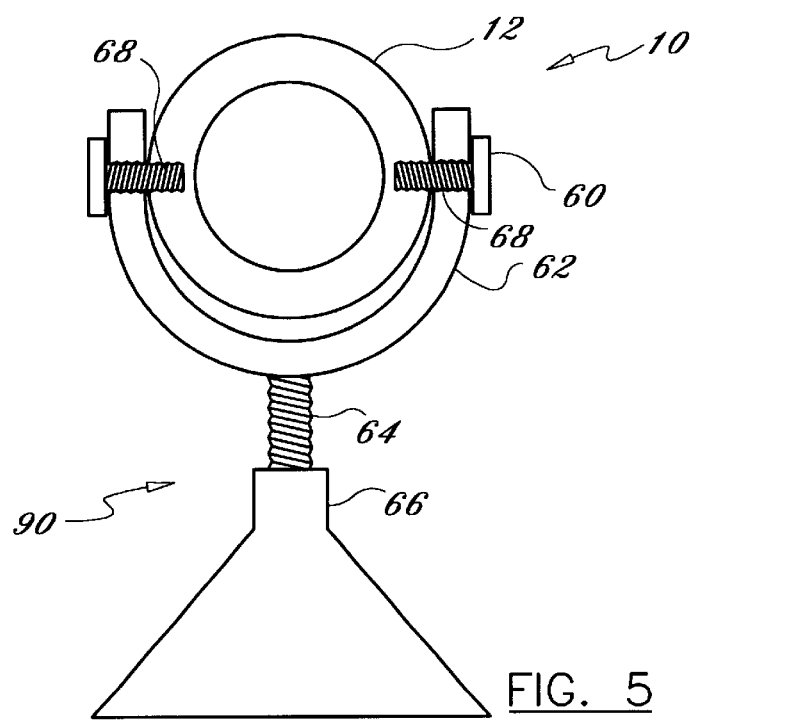
FIG. 5 is a front elevational view of the invention connectible to a first apparatus for attachment thereof to the side of a vehicle.

FIG. 5 depicts instant invention 10 connected to attachment apparatus 90, which is used to attach housing 12 to a vehicle. Attachment apparatus 90 comprises one or more suction cups 66, made of silicone rubber or other similar material. Suction cup 66 is pushed against a surface of a vehicle to create a vacuum thus attaching to the surface of a vehicle. Suction cup 66 is attached to C-clamp 62 or the like by shank 64. Threaded fasteners such as thumb screws or bolts 60 on each side of C-clamp 62 are screwed into threaded openings 68 of body 12 to secure instant invention 10.

Figure 6:
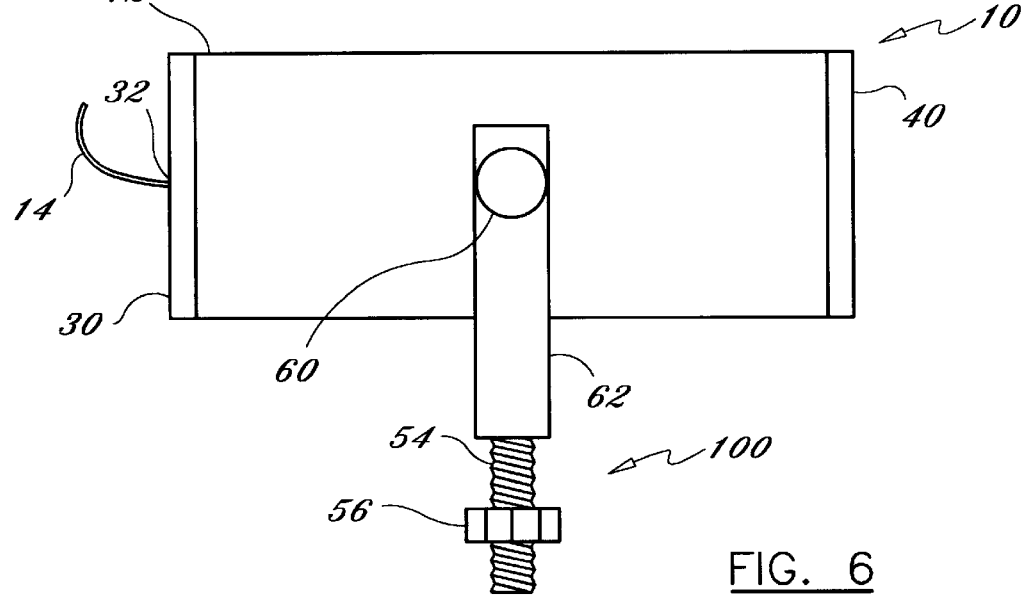
FIG. 6 is a side view of the invention with a second apparatus for attachment thereof to a vehicle.
Figure 7:
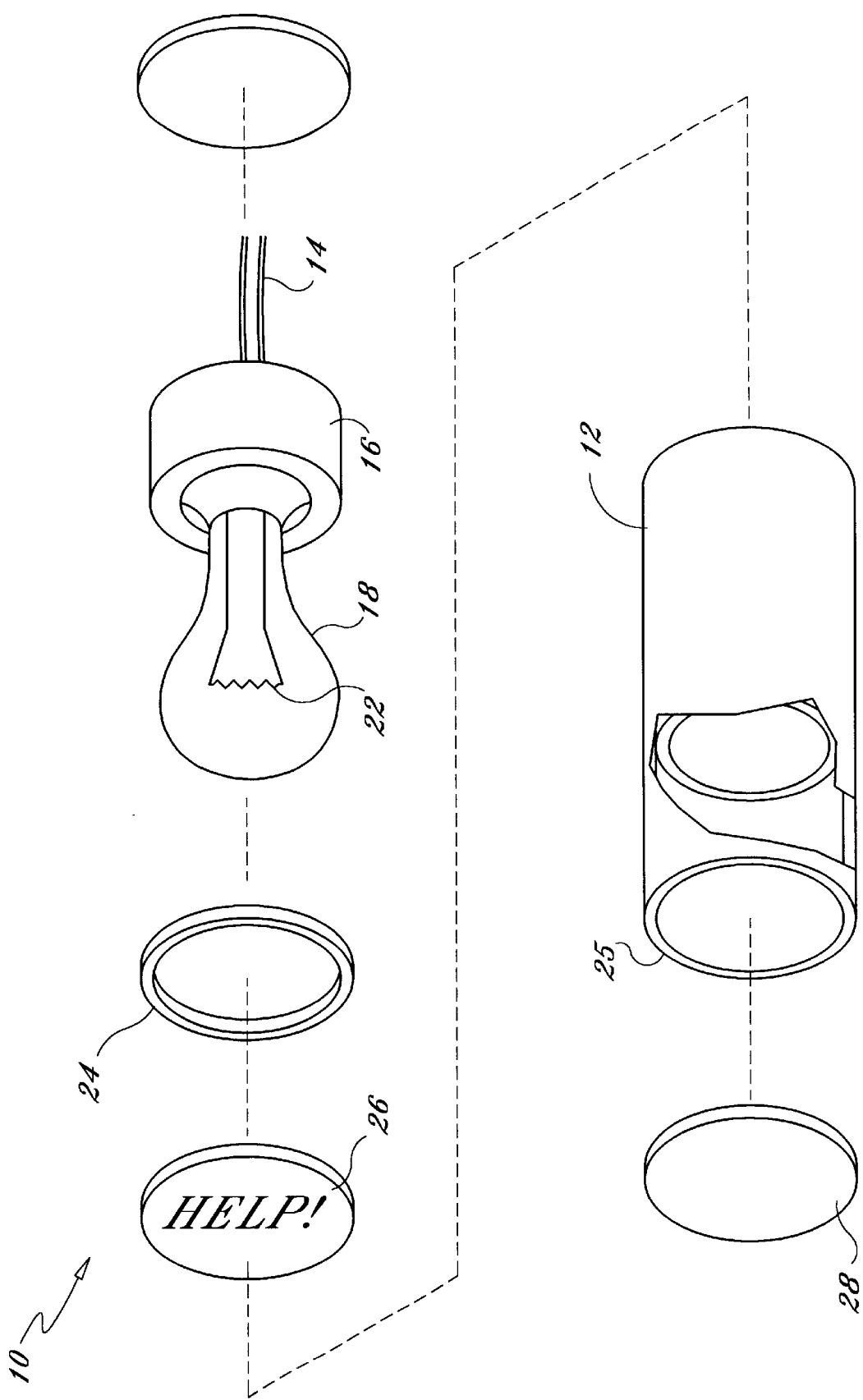
FIG. 7 is an exploded view of the invention.
Figure 8:
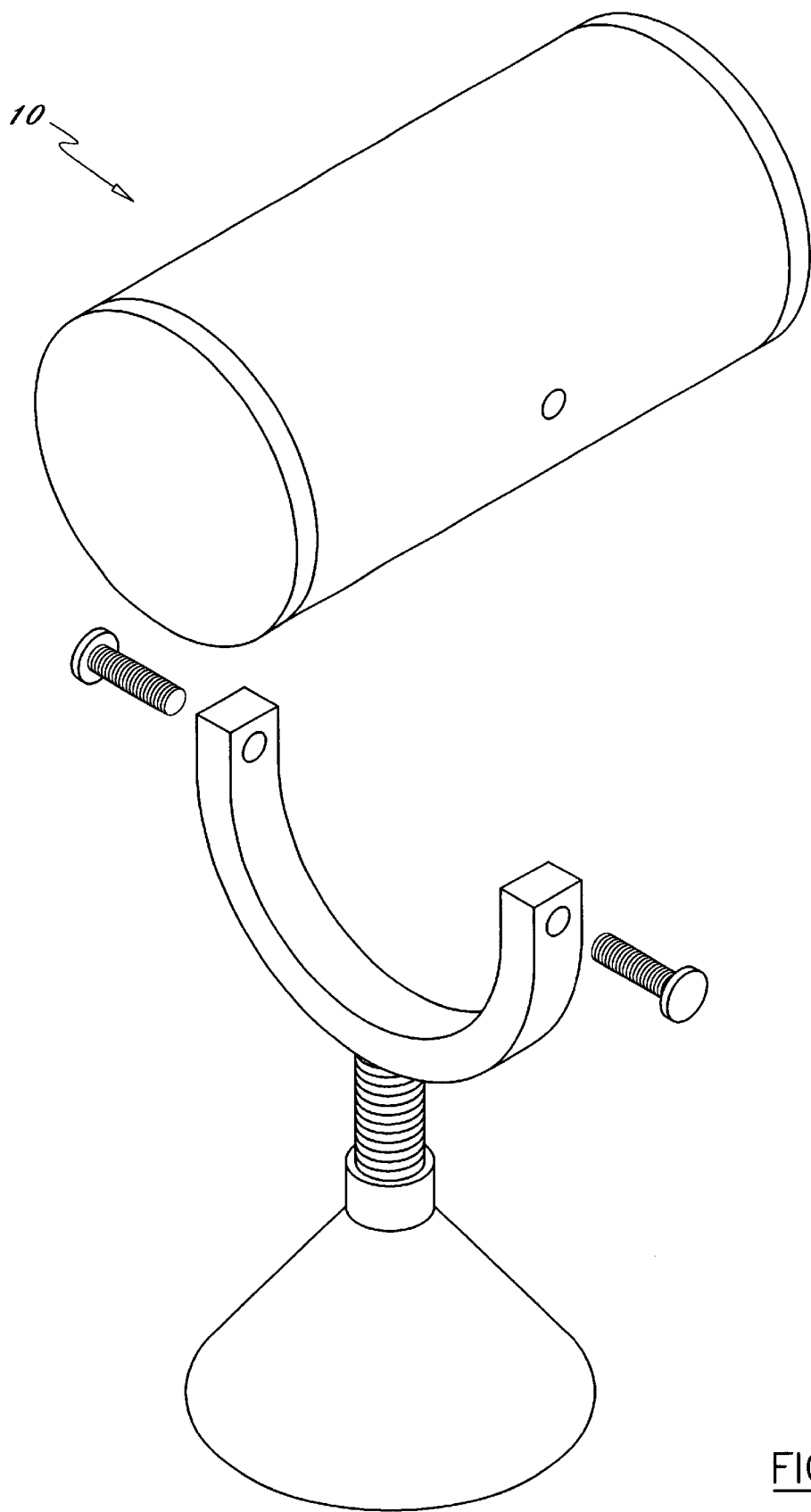
FIG. 8 is an exploded view of the invention showing its relationship to the first apparatus for attachment to a vehicle.
Figure 9:
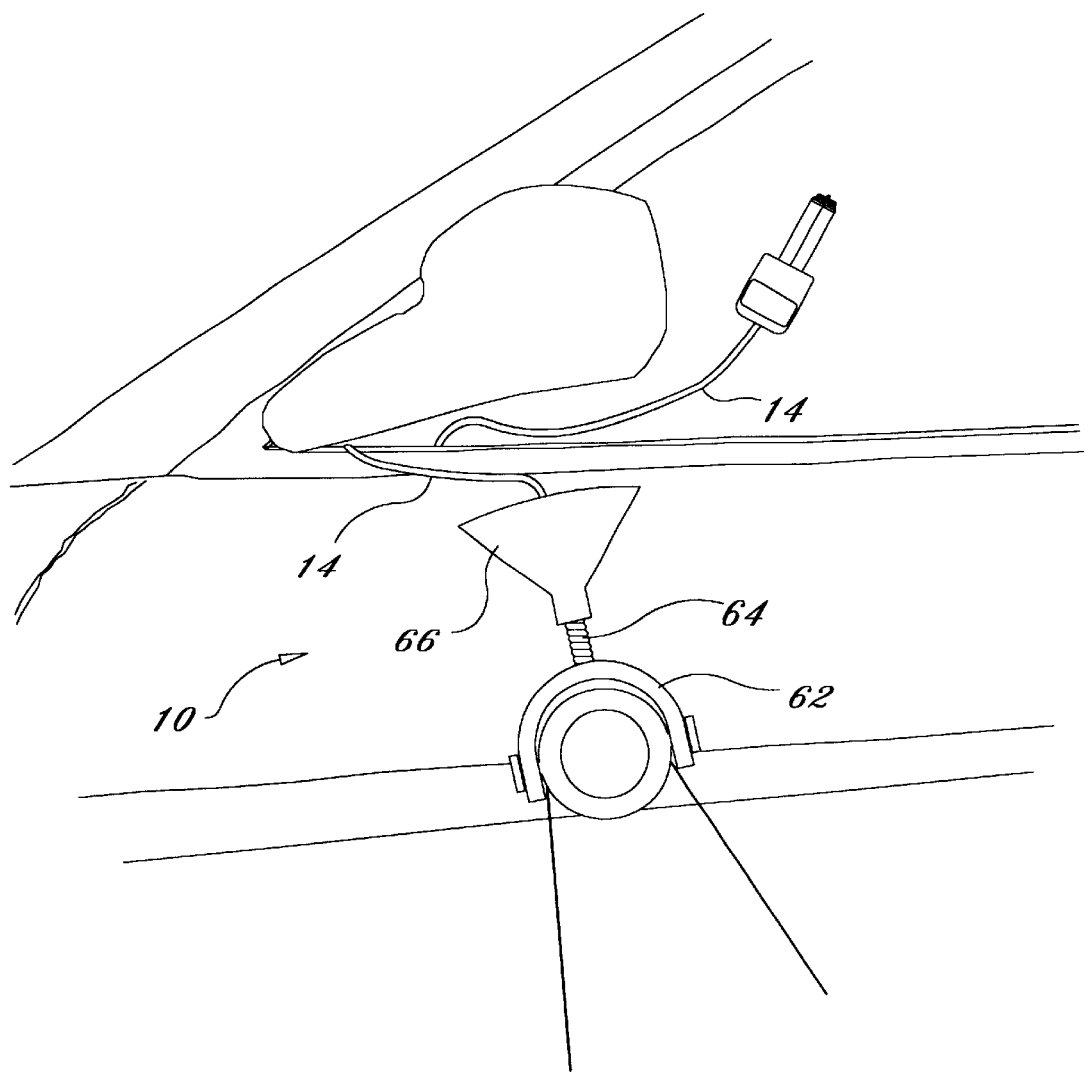
FIG. 9 is a view of the area of enlargement indicated in FIG. 4.

Depicted in FIG. 6 is an alternate embodiment of an attachment apparatus 100. Attachment apparatus 100 is similar to attachment apparatus 90 but dispenses with suction cup 66 and uses threaded male shank 54 instead. Attachment apparatus 100 is secured to a vehicle by inserting shank 54 into an orifice of the vehicle such as in the vehicle bumper or frame and is secured by locking nut 56 or the like.

As can be seen in FIG. 4, an illuminated image from light source 16 can be projected onto any adjacent surface such as the ground or vehicle body depending upon the mounting orientation of the device 10. Any illuminated message (e.g.: "HELP") can be transmitted depending upon the template used.

Illumination source 16 may be powered in any suitable way, such as by wires 14 connected to a cigarette lighter adapter (not shown) adapted to be plugged into the vehicles cigarette lighter (also not shown) in the manner well known in the art.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An illumination device for attachment to a vehicle, said illumination device comprising a housing, a means for illuminating contained within the housing, a projection lens, and an imaging film positioned between said lens and said means for illuminating, a means for manually positioning said housing to allow light from said means for illuminating to be directed in any one of a plurality of directions, a means for mounting said housing to a motor vehicle including a C-shaped bracket connected to a mounting shank, and a means for attachment of the mounting shank to the motor vehicle; wherein said means for manually positioning is disposed outside of the motor vehicle.

2. The device of claim 1, wherein said shank adapted to protrude through an opening in the motor vehicle and wherein the means for attachment of the shank to the motor vehicle is a nut connected at an outer end of a portion of the shank protruding through the opening in the motor vehicle.

3. The device of claim 1, wherein said housing is cylindrically shaped.

4. The device of claim 1, further including means for removably connecting said housing to said C-shaped bracket.

5. The device of claim 4, wherein said means for removably connecting said housing to said C-shaped bracket is comprised of a pair of threaded thumb screws.

6. An illumination device comprising a housing, a means for illuminating contained within the housing, a projection lens, and an imaging film positioned between said lens and said means for illuminating, a means for mounting said housing to a motor vehicle including a C-shaped bracket connected to a mounting shank, and a means for attachment of the mounting shank to the motor vehicle; wherein the means for attachment of the mounting shank to the motor vehicle is comprised of at least one suction cup member.

7. An illumination device comprising a housing, a means for illuminating contained within the housing, a projection lens, and an imaging film positioned between said lens and said means for illuminating, a means for mounting said housing to a motor vehicle including a C-shaped bracket connected to a mounting shank, and a means for attachment of the mounting shank to the motor vehicle; wherein said lens is a Fresnel made of acrylic having the dimensions of 2⅛ inch by 2¼ inch with 215 circular grooves per inch, a focal length of 0.580 inches and a thickness of 0.05 inches.

8. An illumination device for attachment to a vehicle, said illumination device comprising a housing, a means for illuminating contained within the housing, a projection lens, and an imaging member positioned between said lens and said means for illuminating, and a means for mounting said housing to a motor vehicle; wherein said means for mounting includes a C-shaped bracket connected to a mounting shank, and at least one suction cup attached at a first end of the mounting shank.

9. The illumination device of claim 8 wherein said imaging member is an imaging film.

10. The illumination device of claim 8 wherein said imaging member is a template.

11. The illumination device of claim 8 further including means for manually positioning said housing to allow light from said means for illuminating to be directed in any one of a plurality of directions.

12. The illumination device of claim 11 wherein said means for manually positioning is disposed outside of the motor vehicle.

13. The illumination device of claim 8 wherein said imaging member having indicia disposed thereon.

14. The illumination device of claim 13 wherein said indicia is at least one word.

15. An illumination device for attachment to a vehicle, said illumination device comprising a housing, a means for illuminating contained within the housing, a projection lens, and an imaging member positioned between said lens and said means for illuminating, and a means for mounting said housing to a motor vehicle; wherein said lens is a Fresnel made of acrylic having approximate dimensions of 2⅛ inch by 2¼ inch with approximately 215 circular grooves per inch, a focal length of approximately 0.580 inches and a thickness of approximately 0.05 inches.

* * * * *